Oct. 8, 1929. A. B. MODINE 1,730,470
METHOD OF SOLDERING RADIATOR FINS
Filed Sept. 25, 1925  2 Sheets-Sheet 1
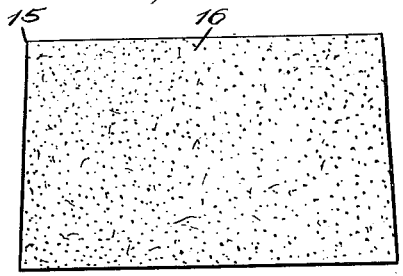
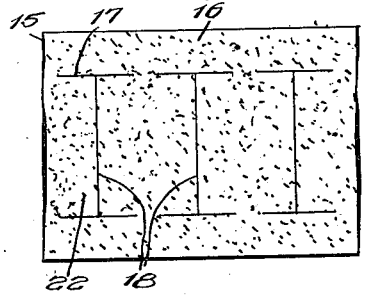
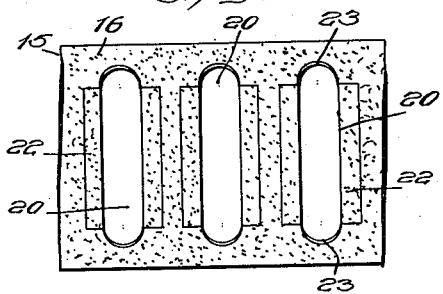
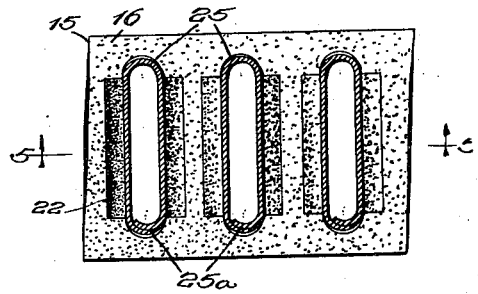
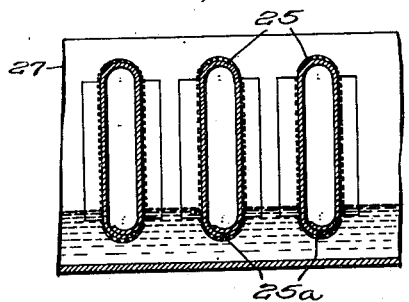
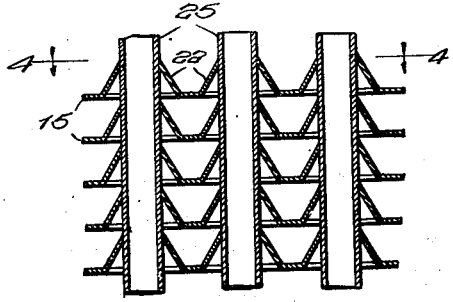

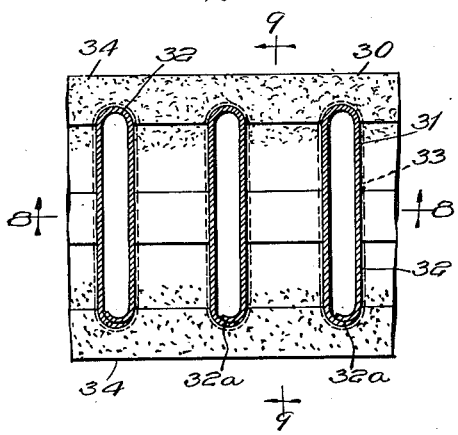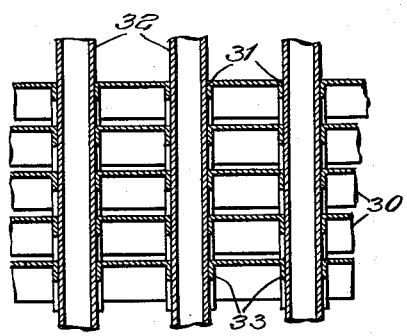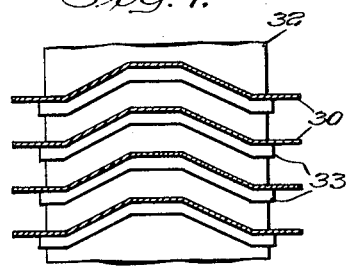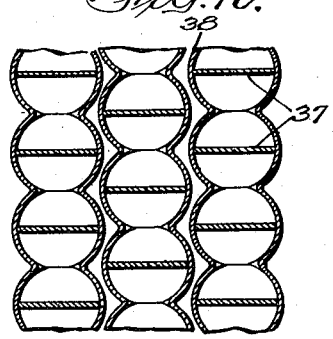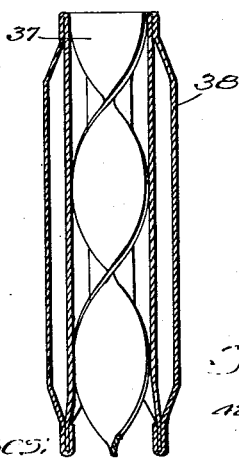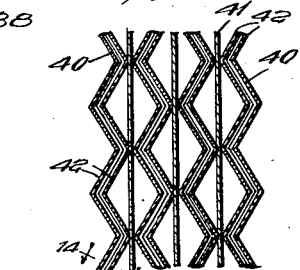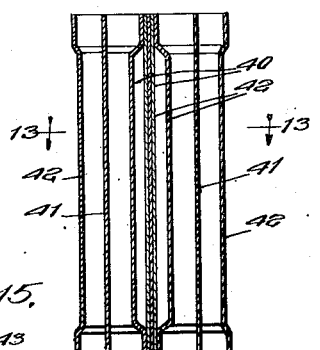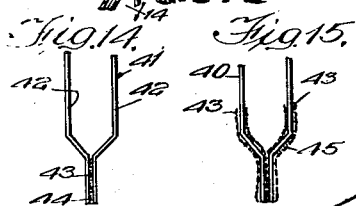

Patented Oct. 8, 1929

1,730,470

UNITED STATES PATENT OFFICE

ARTHUR B. MODINE, OF RACINE, WISCONSIN

METHOD OF SOLDERING RADIATOR FINS

Application filed September 25, 1925. Serial No. 58,542.

My invention relates to a method of soldering and particularly to a method of soldering the elements of a radiator to each other.

The invention has among its other objects the production of soldered devices which are durable, efficient, neat and attractive in appearance and satisfactory for use wherever found applicable.

A particular object of the invention is to provide an improved method of soldering the several elements of a radiator to each other.

Another particular object of the invention is to provide a simplified method whereby several elements of a fabricated device may be secured to each other with a minimum of solder.

Many other objects and advantages of the construction herein shown and described will be obvious to those skilled in the art from the disclosure herein given.

In one form of my invention, the improved method is practised to produce radiators which comprise metallic tubes held in spaced relation by plates which also serve as cooling fins. The plates are first coated with any suitable substance such as paint, varnish, shellac, mineral or chemical substances or the equivalent, and are then punched to provide apertures in which the tubes may be mounted. The assembled plates and tubes are then dipped into a bath of fused solder in such manner that capillary attraction causes the solder to flow around the tubes where they are contacted by the plates, it being understood that the edges of the apertures formed in the plates are cleaned during the punching operation. The solder does not adhere to the coated surfaces of the plates. The seams in the tubes are also soldered during the dipping operation.

In another form of the invention the improved method is practised to solder a plurality of twisted vanes to the cooling tubes of a radiator, the twisted vanes being first coated with a suitable compound, as above described, after which the edges of the vanes are cleaned. The assembled tubes and vanes are then dipped into the solder a sufficient distance to permit the solder to flow along the clean edges of the vanes by capillary attraction.

In the drawings, wherein like reference characters indicate like or corresponding parts:

Fig. 1 is a fragmentary elevation of a coated plate which I employ in one embodiment of the invention;

Fig. 2 is a fragmentary elevation of the coated plate after a plurality of slits have been punched therein;

Fig. 3 is a fragmentary elevation of the coated plate after apertures have been formed therein for accommodating the water-cooling tubes of a radiator;

Fig. 4 shows the coated plate assembled with the cooling tubes;

Fig. 5 is a section taken on line 5—5 of Fig. 4;

Fig. 6 is a section illustrating my improved method of applying solder to the tubes and the coated plate;

Fig. 7 is a fragmentary section taken through a radiator produced by practising another form of the invention;

Fig. 8 is a section taken on line 8—8 of Fig. 7;

Fig. 9 is a section taken on line 9—9 of Fig. 7;

Fig. 10 is a fragmentary section taken through a radiator produced by practising another form of the invention;

Fig. 11 is a section taken on line 11—11 of Fig. 10;

Fig. 12 is a fragmentary section taken through a radiator embodying another form of the invention;

Fig. 13 is a section taken on line 13—13 of Fig. 12;

Fig. 14 is a fragmentary section taken on line 14—14 of Fig. 13; and

Fig. 15 is a fragmentary section corresponding to the section shown in Fig. 14 but illustrating the manner in which the solder adheres to the radiator elements when the elements are not coated before being subjected to the fused solder.

I prefer to disclose the improved method as it is practised to produce radiators of the type commonly employed in automobiles and the like, but I am limited to this use only insofar as defined in the appended claims.

Referring for the present to Figs. 1 to 6, inclusive, the reference character 15 designates a plate to which a coating 16 is applied, the coating being of any suitable substance to which solder will not readily adhere. I preferably used paint, varnish, shellac, mineral or chemical coatings or the equivalent to form the coating 16. In practising one form of the invention, I punch a plurality of slits 17 and 18 in the plate 15 after it has been coated, the slits 17 extending longitudinally of the plate, and the slits 18 extending transversely thereof (Fig. 2). Obviously, the edges of the slits 17 and 18 will not be coated and solder will readily adhere thereto.

In Fig. 3 I have illustrated the manner in which a plurality of apertures 20 are formed in the plate 15. Those portions of the plate 15 disposed intermediate the slits 17 are upset to form inclined vanes 22. It will be noted that the ends of each aperture 20 are rounded as at 23 to accommodate the rounded edges of a water-tube 25 adapted to be inserted in the aperture. In practice, a plurality of plates 15 and tubes 25 are assembled to form a radiator of the type commonly employed in automobiles and the like. The plates and tubes are assembled in such manner that the clean edges of the slits 18 and the free edges 23 contact with the outer surfaces of the tubes 25. The tubes are preferably formed from sheets of metal, the side edges of the sheets being brought together to form lap seams 25$^a$.

As illustrated in Fig. 6, the plates 15 are soldered to the tubes 25 by dipping the assembled tubes and plates into fused solder in such manner that the solder flows around the tubes where they contact with the clean edges of the slits 18 and the free edges 23. The solder is preferably fused in a suitable receptacle 27, and the assembled tubes and plates are dipped into the solder a short distance. The solder does not adhere to the coated surfaces of the plates, nor does it tend to flow over the surfaces of the tubes which are not engaged by or disposed in close proximity to the clean edges of the plates. However, the seams 25$^a$ are soldered during the dipping operation as they are immersed in the fused solder. In some instances I dip the assembled tubes and plates into the solder in the manner illustrated in Fig. 6, and then, after the solder has had an opportunity to flow upwardly along the clean edges of the plates I invert the assembled tubes and plates and again dip them into the solder to insure that all of the clean edges will be soldered to the tubes. This insures that the radiator will function efficiently as heat will readily flow from the tubes through the solder to the plates, which dissipate it in the air.

In Figs. 7, 8 and 9 I have illustrated a radiator of different form which can be economically produced by practising the improved method. The radiator shown in Figs. 7, 8 and 9 comprises a plurality of plates 30 in which apertures 31 are formed to accommodate a plurality of water tubes 32, the tubes 32 being preferably formed with lap seams 32$^a$. The apertures 31 are bounded by continuous flanges 33 formed integral with the plates 30. The plates are bent intermediate their front and rear edges in such manner that they will create a turbulence in the air passing through the radiator.

In practising the improved method, the marginal portions of the plates 30 are coated as at 34 with any suitable substance to which solder will not adhere. The apertures 31 may be formed in the plates before or after the coatings have been applied thereto. In either instance, I clean the inner surfaces of the flanges 33 before subjecting the plates and tubes to fused solder. This may be done with any suitable apparatus, such, as, for instance, a wire brush or the equivalent. After the plates and tubes have been assembled I dip them a short distance into fused solder to permit the solder to flow upwardly between the flanges 33 and the tubes 31. The solder rises because of capillary attraction. I preferably dip the plates and tubes into the fused solder in such manner that the fused solder does not contact with the uncoated portions of the plates. The assembled plates and tubes may be inverted and subjected to the fused solder a second time, if it is so desired.

In Figs. 10 and 11 I have illustrated an embodiment of the invention wherein a plurality of twisted vanes 37 are soldered to water tubes 38 by practising the improved method. The vanes 37 are first coated with any suitable substance to which the solder will not adhere and then the edges of the vanes are cleaned. The assembled vanes 37 and tubes 38 are then dipped into fused solder in substantially the same manner as the devices shown in Figs. 1 to 5, inclusive, are dipped, the assembled vanes and tubes being inverted and subjected to solder for a second time, if it is so desired. The fused solder flows along the clean edges of the vanes 37 where these edges lie in close proximity to or contact with the tubes 38 and fix the vanes in place between the tubes.

Figs. 12, 13 and 14 illustrate another embodiment of the invention wherein a radiator is formed by practising the improved method. This radiator comprises a plurality of water tubes 40 of zig-zag shape which are soldered to a plurality of plates 41 disposed intermediate the tubes 40 and extending from front to back of the radiator. In practising the improved method the outer surfaces of the tubes 40 are preferably coated with any suitable substance to which solder will not adhere and are then cleaned at the points where they will engage the plates 41 when assembled with them. Each tube 40 is formed from bent strips 42 of metal, the marginal edges of the strips being brought in close proximity to each other as indicated at 43 in Fig. 14. The assembled tubes 40 and plates 41 are dipped a short distance into fused solder, whereupon the solder flows along the cleaned portions of the tubes, which portions contact with the plates 41 as above described. The fused solder also flows upwardly between the plates 42 of each tube 40, as indicated at 44 in Fig. 14. The solder does not adhere to the outer coated surfaces of the tubes. In Fig. 15 I have illustrated the manner in which the solder adheres to the tubes 40 if the outer surfaces of the tubes are not coated in the manner set forth. Thus the solder enters between the plates 42 of each tube and also adheres to the outer surfaces of the tubes, as indicated at 45.

If so desired, the tubes and plates forming parts of the above described radiators may be coated with paint, shellac, varnish, mineral or chemical coatings, or the equivalent, and then the parts to which the solder is to be applied may be cleaned by any suitable apparatus. It is only necessary to insure that those portions of the elements which are to be secured to each other are clean and are disposed in close proximity to each other so that capillary attraction will cause the solder to enter between the portions.

Having thus described my invention, it is obvious that various immaterial modifications may be made in the same without departing from the spirit of my invention; hence I do not wish to be understood as limiting myself to the exact form or forms described or uses mentioned.

What I claim as new and desire to secure by Letters Patent is:

1. A method of forming a radiator, which method comprises coating a plurality of plates, stamping apertures in said plates, in such manner that the edges then formed are not coated, passing tubes through said apertures to engage said edges, and partially immersing said assembled plates and tubes in fused solder in such manner that fused solder flows upward by capillary attraction to solder said edges to said tubes.

2. A method of forming a radiator, which method comprises coating a plurality of plates, cutting out apertures in said plates in such manner that the edges formed thereby are not coated, passing tubes through said apertures to engage said edges, and soldering the full lengths of said edges to said tubes by partially immersing opposite ends of said plates together with adjacent edges of said tubes in molten solder.

3. A method of forming a radiator, which method comprises coating a plurality of plates, cutting apertures in said plates in such manner that the edges then formed are not coated, passing tubes through said apertures to engage said edges, and immersing said assembled plates and tubes in fused solder in such manner that the solder joins said edges to said tubes.

In testimony whereof, I have hereunto signed my name.

ARTHUR B. MODINE.